United States Patent [19]

Amano et al.

[11] Patent Number: 5,049,631
[45] Date of Patent: Sep. 17, 1991

[54] METHOD FOR PREPARATION OF VINYL CHLORIDE RESIN IN PRESENCE OF POLYGLYCIDYL COMPOUNDS

[75] Inventors: Tadashi Amano, Kanagawa; Shigehiro Hoshida, Ibaraki, both of Japan

[73] Assignee: Shin-Etsu Chemical Co., Ltd., Tokyo, Japan

[21] Appl. No.: 432,089

[22] Filed: Nov. 6, 1989

[30] Foreign Application Priority Data

Nov. 16, 1988 [JP] Japan ............................... 63-289570
Jan. 17, 1989 [JP] Japan ..................................... 1-8135

[51] Int. Cl.$^5$ .............................................. C08F 2/20
[52] U.S. Cl. ..................................... 526/204; 526/202; 526/344.2
[58] Field of Search ............................... 526/202, 204

[56] References Cited

U.S. PATENT DOCUMENTS 4,454,294  6/1984  Zentner ........................... 526/344.3

*Primary Examiner*—Christopher Henderson
*Attorney, Agent, or Firm*—Wyatt, Gerber, Burke & Badie

[57] ABSTRACT

A vinyl chloride-based polymeric resin having outstandingly high thermal stability is obtained by the suspension polymerization of vinyl chloride monomer, optionally, in combination with a comonomer in an aqueous polymerization medium to which a specific di- or tetraglycidyl compound such as diglycidyl hexahydroisophthalate and 1,3-bis(N,N-diglycidylaminomethyl) cyclohexane is added. The improvement obtained by this method is so remarkable that substantial improvements can be obtained in the thermal stability of the resin even when vinyl chloride is copolymerized with a comonomer having at least two ethylenically unsaturated linkages in a molecule, e.g., diallyl phthalate and 1,6-hexane diol diacrylate, with an object to obtain a resin from which shaped resin articles having mattness in appearance can be prepared.

6 Claims, No Drawings

METHOD FOR PREPARATION OF VINYL CHLORIDE RESIN IN PRESENCE OF POLYGLYCIDYL COMPOUNDS

BACKGROUND OF THE INVENTION

The present invention relates to a method for the preparation of a vinyl chloride-based polymeric resin having improved thermal stability. More particularly, the invention relates to a method for the preparation of a vinyl chloride-based polymeric resin having improved thermal stability in a process of suspension polymerization even when the polymeric resin is a copolymer of vinyl chloride with a substantial amount of a diene or polyene monomer.

As is well known, one of the disadvantageous properties of vinyl chloride-based polymeric resins, referred to as PVC resins hereinafter, is that the resin is susceptible to thermal degradation at an elevated temperature, to which the resin is heated, for example, in the process of molding, to cause "initial coloring", which means coloring of a resin article as molded.

It is therefore conventional that PVC resins are compounded with a so-called stabilizer which is an organic compound containing a metallic element such as tin, lead and the like to give a molding compound. Epoxy resins are also used practically as a stabilizer. Alternatively, a proposal has been made to improve the thermal stability of a PVC resin by suspension-polymerizing vinyl chloride monomer in an aqueous medium to which an epoxy resin is admixed.

This method of suspension polymerization with admixture of an epoxy resin, however, is not quite satisfactory because epoxy resins in general are colored in brown so that the PVC resin obtained by using an epoxy resin as polymerized is already more or less colored to decrease the clarity of the resin article as molded in addition to the relatively low effectiveness of conventional epoxy resins as a thermal stability improver.

On the other hand, it is eagerly desired in the industry of PVC resins to develop a PVC resin capable of giving a molded or shaped resin article having a mat appearance as a consequence of the content of a small amount of a gelled fraction in the resin but still having high thermal stability. Such a special-grade PVC resin is usually prepared by the copolymerization of vinyl chloride monomer with a diene or polyene monomer, i.e., a monomer copolymerizable with vinyl chloride and having at least two ethylencially unsaturated groups in a molecule, which is referred to as a polyfunctional monomer hereinafter. The thermal stability of a PVC res-n is usually greatly decreased when the polymer contains a substantial amount of a moiety derived from such a polyfunctional monomer introduced by copolymerization. The above men-tioned method of polymerization of vinyl chloride monomer has little effectiveness for the improvement of the thermal stability of the resin when vinyl chloride monomer is copolymerized with a polyfunctional monomer in the presence of an epoxy resin. Nevertheless, no material effort has been directed to the solution of the problem of thermal stability of the resin product of this type. Now that the investigations have given a fruit on the improvement of PVC resins copolymerized with a polyfunctional monomer relative to the mattness and creeping performance of the shaped articles therefrom, it is eagerly desired to obtain a PVC resin copolymerized with a polyfunctional monomer but still having greatly improved thermal stability to comply with the recent development of the application fields of PVC resins of such a type.

SUMMARY OF THE INVENTION

The present invention accordingly has an object to provide a method of suspension polymerization for the preparation of a PVC resin having greatly improved thermal stability to show remarkably decreased initial coloring of a shaped article of the resin as molded and thermal degradation thereof at an elevated temperature. In particular, the object of the present invention is to provide a copolymeric PVC resin of vinyl chloride with a substantial amount of a polyfunctional monomer having greatly improved thermal stability by the method of suspension polymerization.

Thus, the method of the present invention for the preparation of a PVC resin comprises:

suspension-polymerizing vinyl chloride monomer or a monomeric mixture mainly composed of vinyl chloride in an aqueous polymerization medium containing a suspending agent and a polymerization initiator, the aqueous polymerization medium being admixed with from 0.1 to 10 parts by weight, per 100 parts by weight of the vinyl chloride monomer or a monomeric mixture thereof, of a glycidyl compound selected from the group consisting of diglycidyl ester compounds represented by the general formula $$G-O-CO-R^1-CO-O-G, \qquad (I)$$

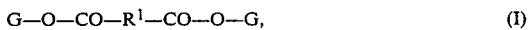

in which G is a glycidyl group and $R^1$ is an oxygen atom, methylene group, ethylene group or 1,3-cyclohexylene group, or bis(diglycidylamino) compounds represented by the general formula $$G_2N-R^2-NG_2, \qquad (II)$$

in which G has the same meaning as defined above and $R^2$ is an oxygen atom, methylene group, 1,3-cyclohexylene group or 1,3-cyclohexylene-bismethylene group.

The advantageous effect obtained by the addition of the specific di- or tetraglycidyl compound to the polymerization mixture as mentioned above is particularly remarkable when the monomer mixture to be suspension-polymerized contains from 0.1 to 10% by weight of a polyfunctional monomer, the balance being vinyl chloride monomer and other optional comonomers.

DETAILED DESCRIPTION OF THE PREFERRED EMBODIMENTS

As is described above, the most characteristic feature of the inventive method is admixture of a specific di- or tetraglycidyl compound with the aqueous polymerization medium for the suspension polymerization of vinyl chloride monomer, optionally, in combination with other comonomers. Different from conventional epoxy resins of the bisphenol A type, novolac type and polyglycol type, the di- or tetraglycidyl compound represented by the above given general formula (I) or (II), respectively, is an inherently little colored compound so that the PVC resin product prepared by the inventive method is free from the disadvantageous coloring by the addition of a colored additive compound. This advantage is most prominent with a glycidyl compound having a cyclohexane ring in the molecular structure so that a great improvement can be obtained in the thermal stability of the PVC resin by using a relatively large amount of the compound without the problem of coloring.

The above defined specific glycidyl compounds are soluble in the vinyl chloride monomer and compatible with the polymeric resin so that a substantial amount of the compound is contained in the PVC resin and acts as a heat stabilizer. Therefore, the PVC resin obtained by the inventive method causes little problem of initial coloring even when the polymeric resin after completion of the polymerization reaction is heated at a relatively high temperature during processing.

The diglycidyl compound represented by the general formula (I) includes a compound of the formula G—O—CO—O—CO—O—G, diglycidyl malonate, diglycidyl succinate and diglycidyl hexahydroisophthalate, of which the last mentioned compound is preferred. The tetraglycidyl compound represented by the general formula (II) includes a compound of the formula $G_2N$—O—$NG_2$, bis(diglycidylamino) methane, 1,3-bis(diglycidylamino) cyclohexane and 1,3-bis(N,N-diglycidylaminomethyl) cyclohexane, of which the last mentioned compound is preferred. The amount of the glycidyl compound added to the polymerization mixture is in the range from 0.1 to 10 parts by weight or, preferably, from 0.5 to 8 parts by weight per 100 parts by weight of the vinyl chloride monomer or the monomer mixture. When the amount of the glycidyl compound is too small, the desired effect of improvement in the thermal stability of the PVC resin cannot be obtained as a matter of course. On the other hand, no further increase can be obtained in the improving effect even by increasing the amount of the glycidyl compound over the above mentioned upper limit rather with an economical disadvantage.

The above described glycidyl compound can be introduced into the polymerization mixture by any known method without particular limitations. For example, the compound as such can be added to the polymerization mixture or added in the form of a solution prepared beforehand by dissolving the compound in a suitable organic solvent. The moment at which the glycidyl compound is introduced into the polymerization mixture is also not limitative although it is preferable that the compound is introduced into the polymerization mixture not later than the start of the polymerization reaction. For example, the compound can be added during proceeding of the polymerization reaction or even after completion of the polymerization reaction but before dehydration of the polymerizate slurry.

The method of the present invention is applicable not only to the homopolymerization of vinyl chloride monomer alone but also to the copolymerization of a monomeric mixture mainly composed of vinyl chloride monomer provided that at least 50% by weight of the mixture is vinyl chloride monomer. The comonomer combined with vinyl chloride monomer in the monomeric mixture is exemplified by any known monomers copolymerizable with vinyl chloride including vinyl esters such as vinyl acetate and vinyl propionate, esters of acrylic and methacrylic acids such as methyl acrylate, diethyl acrylate and methyl methacrylate, olefins such as ethylene and propylene, maleic anhydride, acrylonitrile, styrene, vinylidene chloride and the like.

In particular, the comonomer can be a polyfunctional monomer which is a monomeric compound having at least two ethylenically unsaturated linkage in a molecule. Examples of such a polyfunctional monomer include diallyl esters of phthalic acid such as diallyl isophthalate and diallyl terephthalate, diallyl and divinyl esters of an ethylenically unsaturated dibasic carboxylic acid such as diallyl maleate, diallyl fumarate, diallyl itaconate, divinyl itaconate and divinyl fumarate, diallyl and divinyl esters of a saturated dibasic carboxylic acid such as diallyl adipate, divinyl adipate, diallyl azelate and diallyl sebacate, diallyl ether, triallyl cyanurate, triallyl isocyanurate, triallyl trimellitate, divinyl ethers such as ethylene glycol divinyl ethrr, n-butane diol divinyl ether and octadecane diol divinyl ether, vinyl and allyl esters of acrylic or methacrylic acid such as vinyl acrylate, vinyl methacrylate, allyl acrylate and allyl methacrylate, diacrylates and dimethacrylates of a polyhydric alcohol such as ethylene glycol dimethacrylate, triethylene glycol dimethacrylate and polyethylene glycol diacrylates, triacrylate and trimethacrylate of a polyhydric alcohol such as trimethylol propane trimethacrylate, trimethylol ethane trimethacrylate, trimethylol propane triacrylate and trimethylol ethane triacrylate, bismethacryloxy ethylene terephthalate and 1,3,5-triacryloyl hexahydro triazine as well as low-molecular polymers of a diene monomer such as 1,2-butadiene. These polyfunctional monomers can be used either singly or as a combination of two kinds or more according to need.

The amount of the above described polyfunctional monomer or monomers should be in the range from 0.1 to 10% by weight based on the overall amount of the monomeric mixture depending on the desired degree of mattness of the shaped resin article. It is optional that the whole amount of the polyfunctional monomer is added at one time before the start or in the relatively early stage of the polymerization reaction or portionwise during proceeding of the polymerization reaction.

The procedure of the suspension polymerization to practice the inventive method can be performed according to the conventional manner excepting the addition of the specific glycidyl compound mentioned above. For example, the aqueous polymerization medium should contain a suspending agent which is a water-soluble polymeric compound such as water-soluble cellulose ethers, e.g., methyl cellulose, hydroxyethyl cellulose, hydroxypropyl cellulose and hydroxypropyl methyl cellulose, partially saponified polyvinyl alcohols, poly(acrylic acid), gelatin and the like, optionally, in combination with a surface active agent including monomersoluble ones, e.g., sorbitan monolaurate, sorbitan trioleate, glycerin tristearate and block copolymers of ethylene oxide and propylene oxide, and water-soluble ones, e.g., polyoxyethylene sorbitan monolaurate, polyoxyethylene glycerin oleate and sodium laurate. These suspending agents can be used either singly or as a combination of two kinds or more according to need.

The polymerization mixture also should contain a polymerization initiator which can be selected from those conventionally used in the suspension polymerization of vinyl monomer without particular limitations. Examples of suitable polymerization initiators include percarbonate compounds, e.g., di(isopropylperoxy)dicarbonate, di(2-ethylhexylperoxy) dicarbonate and di(ethoxyethylperoxy) dicarbonate, perester compounds, e.g., tert-butylperoxy pivalate, tert-hexylperoxy pivalate, tert-butylperoxy neodecanoate and α-cumylperoxy neodecanoate, peroxides, e.g., acetyl cyclohexylsulfonyl peroxide, 2,4,4-trimethylpentyl-2-peroxy phenoxy acetate and 3,5,5-trimethylhexanoyl peroxide, and azo compounds, e.g., azobis-2,4-dimethyl valeronitrile and azobis(4-methoxy-2,4-dimethyl valeronitrile) as well as water-soluble inorganic peroxides, e.g., ammonium persulfate, potassium persulfate and hydrogen peroxide. These polymerization initiators can be used either singly or as a combination of two kinds or more according to need.

The polymerization reaction of the inventive method can be performed under substantially the same conditions as in the conventional procedure for the suspension polymerization of vinyl chloride monomer including the manner for the introduction of the above described ingredients into the polymerization reactor, schedule for the temperature elevation, addition of other optional additives, e.g., polymerization degree controlling agents, chain transfer agents, pH adjusting agents, gelation improvers, antistatic agents, antioxidants and scale deposition inhibitors, and so on.

In the following, the method of the present invention is described in more detail by way of examples.

EXAMPLES 1 TO 4 AND COMPARATIVE EXAMPLES 1 TO 4.

Into a stainless steel-made autoclave of 2000 liter capacity equipped with a stirrer and a jacket for cooling and heating water were introduced 900 kg of deionized water, 300 g of a partially saponified polyvinyl alcohol, 176 g of azobis-2,4-dimethylvaleronitrile and diglycidyl hexahydroisophthalate (Examples 1 and 2) or 1,3-bis(N,N-diglycidylaminomethyl) cyclohexane (Examples 3 and 4) each in an amount shown as the epoxy compound in Table 1 below to form an aqueous polymerization medium. The autoclave was evacuated until the pressure inside was decreased to 50 mmHg and then 600 kg of vinyl chloride monomer were introduced thereinto to form a polymerization mixture.

The polymerization mixture in the autoclave was heated by passing hot water through the jacket up to a temperature of 64° C. and this temperature was maintained with agitation of the polymerization mixture to effect the polymerization reaction until the pressure inside the autoclave had dropped to 8.0 kg/cm$^2$G when the polymerization reaction was terminated. Thereafter, the temperature of the thus produced polymerizate slurry was increased to 90° C. to recover the unreacted vinyl chloride monomer. The polymerizate slurry was then discharged out of the autoclave, dehydrated and dried in a conventional manner to give about 500 kg of a polyvinyl chloride resin.

The formulation of the polymerization mixtures in Comparative Examples 1 to 4 was the same as in the above described Examples excepting omission of the glycidyl or epoxy compound in Comparative Example 1 and replacement of the di- or tetraglycidyl compound with a bisphenol A-type epoxy resin with n=20, a novolac-type epoxy resin with n=1.6 or a polyglycol-type epoxy resin with n=3 in Comparative Examples 2, 3 and 4, respectively, each in an amount indicated in Table 1. The procedure for the polymerization reaction in these comparative examples was substantially the same as in Examples 1 to 4.

The PVC resins obtained in the above described examples and comparative examples were each subjected to the test of thermal stability and test of initial coloring according to the procedures described below to give the results shown in Table 1. The term of "parts" given below always refers to "parts by weight".

Thermal Stability Test

A resin compound was prepared by uniformly milling, for 5 minutes on a test roller mill at 180° C., 100 parts of the PVC resin, 8 parts of an impact strength improver (B-22, a product by Kaneka Co.), 6 parts of an epoxidated soybean oil, 0.1 part of calcium stearate, 0.3 part of zinc stearate and 0.2 part of a lubricant (Hoechst Wax PE-190). The resin compound was sheeted into a sheet having a thickness of 0.5 mm which was kept in a Geer's oven at 180° C. to record the time in minutes taken for complete blackening of the sheet as a measure of the thermal stability.

Initial Coloring Test

The PVC resin compound prepared in the same formulation and under the same conditions as above was compression-molded into a test plate having a thickness of 5 mm, of which the indices of L, a and b were measured using a color meter manufactured by Nippon Denshoku Kogyo Co. to give the results shown in Table 1.

EXAMPLES 5 TO 8 AND COMPARATIVE EXAMPLES 5 TO 8.

Into a stainless steel-made polymerization reactor were introduced 60 kg of deionized water, 30 g of a partially saponified polyvinyl alcohol, 15 g of di-2-ethylhexylperoxy dicarbonate and 90 g of diallyl phthalate (Examples 5 and 7 and Comparative Examples 5 and 7) or 150 g of 1,5-hexane diol diacrylate (Examples 6 and 8 and Comparative Examples 6 and 8) as a polyfunctional monomer. In addition, diglycidyl hexahydroisophthalate (Examples 5 and 6) or 1,3-bis(N,N-diglycidylaminomethyl) cyclohexane (Examples 7 and 8) was added each in an amount indicated in Table 1 below as an epoxy compound while no glycidyl compound was added in Comparative Example 5 and the glycidyl compound was replaced with a bisphenol A-type epoxy resin with n=20, a novolac-type epoxy resin with n=1.6 or a polyglycol-type epoxy resin with n=3 in Comparative Examples 6, 7 and 8, respectively, each in an amount indicated in Table 1.

After evacuation of the polymerization reactor to have a reduced pressure of 100 mmHg, 30 kg of vinyl chloride monomer were introduced thereinto and the polymerization mixture under agitation was heated up to 57° C. by passing hot water through the jacket of the reactor. The same temperature was maintained to effect the polymerization reaction until the pressure inside the reactor had dropped to 6.0 kg/cm$^2$G when the polymerization reaction was terminated. The unreacted vinyl chloride monomer was discharged out of the reactor and the polymerizate slurry taken out of the reactor was dehydrated and dried to give about 25.8 kg of a PVC resin product.

The PVC resin products obtained in the above described examples and comparative examples were each subjected to the test of thermal stability, test of initial coloring and determination of the insoluble gel fraction according to the procedures described below to give the results shown in Table 1.

Thermal Stability Test

The testing conditions were substantially the same as in Examples 1 to 4 except that the temperature of the Geer's oven was 170° C. instead of 180° C.

Initial Coloring Test

The testing conditions were substantially the same as in Examples 1 to 4 except that the temperature in the compression molding to prepare the test plate was 160° C. instead of 180° C.

Determination of Insoluble Gel Fraction

A 1 g portion of the PVC resin was added to 100 ml of tetrahydrofuran at 60° C. and the mixture was thoroughly agitated at the same temperature to dissolve the resin. Thereafter, the mixture was kept standing for 24 hours to be allowed to cool to room temperature and a 10 ml portion of the supernatant was taken and evaporated to dryness to determine the amount of the resin as dissolved therein, from which the amount of the insoluble gelled matter was calculated and expressed in % by weight based on the amount of the PVC resin taken.

TABLE 1

|  | Epoxy compound added, kg | Thermal stability, minutes | L | a | b | Gel fraction, % |
|---|---|---|---|---|---|---|
| Example |  |  |  |  |  |  |
| 1 | 3 | 50 | 70.8 | −1.9 | 12.8 |  |
| 2 | 30 | 90 | 70.2 | −2.0 | 13.0 |  |
| 3 | 12 | 65 | 69.8 | −2.4 | 13.1 |  |
| 4 | 48 | 90 | 69.6 | −2.3 | 13.2 |  |
| 5 | 6 | 60 | 67.8 | −1.9 | 11.0 | 22 |
| 6 | 30 | 95 | 68.1 | −1.9 | 11.0 | 23 |
| 7 | 3 | 50 | 66.2 | −2.1 | 11.1 | 21 |
| 8 | 42 | 90 | 68.3 | −2.0 | 10.8 | 26 |
| Comparative Example |  |  |  |  |  |  |
| 1 | — | 30 | 68.6 | −2.1 | 13.8 |  |
| 2 | 30 | 75 | 68.3 | −2.0 | 14.0 |  |
| 3 | 30 | 80 | 68.5 | −2.2 | 14.3 |  |
| 4 | 30 | 60 | 68.6 | −2.1 | 14.1 |  |
| 5 | 0 | 40 | 65.0 | −1.8 | 11.3 | 18 |
| 6 | 30 | 70 | 64.8 | −1.8 | 11.3 | 24 |
| 7 | 30 | 75 | 64.9 | −1.9 | 11.4 | 16 |
| 8 | 30 | 60 | 65.1 | −1.8 | 11.5 | 19 |

What is claimed is:

1. A method for the preparation of a vinyl chloride-based resin which comprises:
suspension-polymerizing vinyl chloride monomer or a monomeric mixture mainly composed of vinyl chloride in an aqueous polymerization medium containing a suspending agent and a polymerization initiator, the aqueous polymerization medium being admixed with from 0.1 to 10 parts by weight, per 100 parts by weight of the vinyl chloride monomer or the monomeric mixture, of a glycidyl compound selected from the group consisting of diglycidyl ester compounds represented by the general formula $$G-O-CO-R^1-CO-O-G,$$

in which G is a glycidyl group and $R^1$ is an oxygen atom, methylene group, ethylene group or 1,3-cyclohexylene group, or a bis(diglycidylamino) compound represented by the general formula $$G_2N-R^2-NG_2,$$

in which G has the same meaning as defined above and $R^2$ is an oxygen atom, methylene group, 1,3-cyclohexylene group or 1,3-cyclohexylene-bismethylene group.

2. The method for the preparation of a vinyl chloride-based resin as claimed in claim 1 wherein the glycidyl compound is diglycidyl hexahydroisophthalate or 1,3-bis(N,N-diglycidylaminomethyl) cyclohexane.

3. The method for the preparation of a vinyl chloride-based resin as claimed in claim 1 wherein the amount of the vinyl chloride monomer in the monomeric mixture is at least 50% by weight.

4. The method for the preparation of a vinyl chloride-based resin as claimed in claim 3 wherein the monomeric mixture further contains from 0.1 to 10% by weight of a monomeric compound having at least two ethylenically unsaturated linkages in a molecule.

5. The method for the preparation of a vinyl chloride-based resin as claimed in claim 4 wherein the monomeric compound having at least two ethylenically unsaturated linkages in a molecule is diallyl phthalate or 1,6-hexane diol diacrylate.

6. The method for the preparation of a vinyl chloride-based resin as claimed in claim 1 wherein the amount of the glycidyl compound is in the range from 0.5 to 8 parts by weight per 100 parts by weight of the vinyl chloride monomer or the monomeric mixture.

* * * * *